June 8, 1937. H. D. COWLES 2,083,254
ELECTROLYTIC DEVICE AND ELECTROLYTE THEREFOR
Filed June 12, 1935
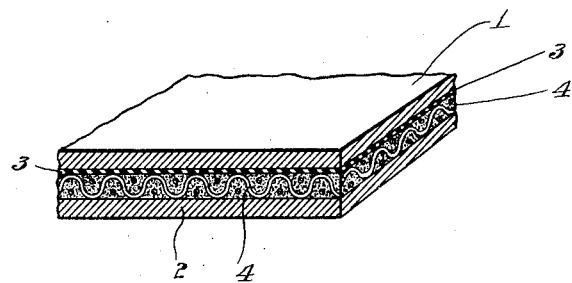
Harry D. Cowles
INVENTOR
BY John J. Rogan
ATTORNEY Patented June 8, 1937

2,083,254

UNITED STATES PATENT OFFICE 2,083,254

ELECTROLYTIC DEVICE AND ELECTROLYTE THEREFOR

Harry D. Cowles, East Orange, N. J., assignor to Electro-Mechanical Research, Inc., Brooklyn, N. Y., a corporation of New York Application June 12, 1935, Serial No. 26,103

6 Claims. (Cl. 175—315)

This invention relates to electrolytic devices such as electrolytic condensers, lightning arresters or the like, and more particularly to an improved electrolyte for such devices.

An object of the invention is to provide an improved electrolyte for use in conjunction with filmed metal electrodes, such for example as are used in electrolytic condensers of the filmed metal anode type.

Another object is to provide an improved electrolyte for electrolytic condensers or the like having a metalic catalytic accelerator.

Another object is to provide an improved electrolyte for electrolytic condensers or the like which has a powdered metal catalytic accelerator.

Another object is to provide an improved electrolyte for use in conjunction with oxide-film electrodes, the electrolyte having incorporated therein an oxidation catalyst and a catalytic autoionization accelerator.

A feature of the invention relates to an electrolytic condenser or the like, having a filmed metal anode and an electrolyte containing in comminuted form a metal catalytic accelerator which has sufficiently low electrochemical difference with respect to the anode metal as to inhibit corrosion of the catalyst or of the anode.

Another feature relates to an electrolyte for electrolytic devices having a powdered metal therein to impart to the electrolyte a positive temperature-resistance coefficient.

A further feature relates to an electrolyte for electrolytic devices having a comminuted metal therein to increase the conductivity and heat radiating powers of the electrolyte.

A still further feature relates to an electrolytic condenser having an electrolyte with a finely divided metal therein whereby the efficiency of the condenser is increased and the liability to break-down of the oxide film on the anode is materially reduced.

Other features and advantages of the invention not specifically enumerated will be apparent after a consideration of the following detailed description and the appended claims.

While the invention is capable of use in a wide variety of electrolytic condensers, it is particularly useful in connection with the electrolytic condensers of the dry or semi-dry type. As is well-known, these types of condensers usually consist of a pair of spaced metal electrodes of aluminum, tantalum or similar metal either one or both of the electrodes being provided with a highly insulating layer of the metal oxide. Thus in the case of aluminum electrodes this layer will consist of aluminum oxide. In one known type of filmed anode condenser the film is composed of what may be termed an "active" layer and an "inactive" layer, it being understood that the present invention is advantageous in connection with either the single layer or the double layer oxide-film type of electrode.

In accordance with the present invention there is added to the usual electrolyte a specially chosen metal in a finely divided state. I have found that by using a metal which is very close, in the electrochemical series, to the metal of the anode, it is possible to increase the efficiency of the electrolytic condenser. It has been proposed heretofore to incorporate powdered carbon or lamp black to the electrolyte of electrolytic condensers as a conductive filler for such electrolyte. Thus there is described in U. S. Patent No. 1,986,779 a process of manufacturing an electrolytic condenser of the double-layer film type, wherein powdered lamp black is used as the conductive filler. I have found that one of the reasons why certain metals are unsatisfactory as conductive fillers, is because of their tendency to corrode or polarize thus decreasing rather than increasing the efficiency of the condenser. I have further found that this difficulty may be overcome by using a filler of powdered metal which has substantially the same position in the electrochemical series as the metal of the anode proper. Thus where an aluminum anode is employed, the conductive filler should preferably consist of powdered aluminum or other powdered metal very close to aluminum in the E. M. F. series.

As shown in the drawing, the condenser may comprise two metal plates 1 and 2 of aluminum, tantalum, magnesium, manganese, tungsten, beryllium, molybdenum, tin or lead or other metal that readily forms a high resistance oxide-film 3 and which is capable of giving rise to an electromotive force of polarization. The filmed electrodes are separated by an electrolyte 4 which may consist of a viscous, heterogeneous complex mixture of a high resistance, film-forming electrolyte such for example as ammonium borate and an alcohol such as glycol, having incorporated therein a predetermined quantity of the powdered metal. Thus when the anode consists of aluminum, ultra-fine aluminum powder for example 600 or more mesh may be employed. If the condenser is to be of the dry or semi-dry type, the proportions of the components of the electrolyte are adjusted to provide the desired plastic consistency. The amount of aluminum powder that is added will be determined by the specific resistance desired for the electrolyte, and may be varied over a wide range in accordance with the use to which the condenser is to be put. Thus the aluminum powder may vary as low as 2% and as high as 30% of the total volume of the electrolyte. Preferably there is added to the electrolyte between 0.1% and 10.0% of an anodic catalyst such for example as a ceric oxide or similar compound of the cerium group. If desired, the anodic oxidation catalyst may include or consist of chromic acid or vanadic acid or a mixture of these materials. However it has been found that cerous salts are desirable because on electrolysis they give an anodic oxidation to ceric salts. These salts being amphoteric, act similar to a weak acid forming a double complex with a base, but being unstable are easily decomposed by acid into ceric hydroxide, which in turn combines with the acid. Furthermore ceric salts in weak acids undergo auto-reduction to an appreciable extent, and when present in the electrolyte they cause the latter to act as if supersaturated with oxygen thus helping to preserve the anodic oxide-film. Furthermore, the oxidation potential of the ceric ion is greater than oxygen so that oxidation takes place without a gaseous reaction.

When it is desired to form a condenser of the filmed anode type, a water soluble polyalcohol such as glycol may be mixed with a polybasic film forming acid such as boric acid to form preferably a highly polymerized plastic reaction product of the desired plasticity and hydroxyl ion concentration. In place of a polyalcohol, if desired, a monatomic high boiling point alcohol may be used. The reaction product may be heated to a suitable temperature to reduce it to a somewhat syrupy consistency, and a predetermined quantity of the finely divided aluminum or other metal as pointed out above, may be worked into the body of the plastic mass, the working being continued for a sufficiently long time and at a suitable temperature to impart the desired plasticity to the mixture. Upon cooling the mixture, it may be rolled into sheets of the desired thickness which may be used both as the electrolyte and, if desired, as the separator between the metal electrodes of the condenser. On the other hand the plastic mixture may be treated to render it sufficiently viscous so that it may be brushed or spread on a suitable carrier such as a gauze strip which may be interposed between the metal electrodes. Thus as shown in the drawing the condenser electrodes are spaced by means of a gauze strip 5 which has had applied thereto a quantity of the above described electrolyte containing the metal powder and the anodic oxidation catalyst.

In one particular method that has been found to produce good results, 60 grams of boric acid powder (C. P.) is mixed with approximately 9 c. c. of ammonium hydroxide and 30 c. c. of glycol or any other suitable alcohol. A small percentage of cerium salts or other anodic oxidation catalyst described above, may be added. The mixture is heated to a temperature of approximately 126° C. for a predetermined length of time depending upon the viscosity desired, the heating being continued until the water content of the electrolyte is between 10% and 15%, and preferably the water content is kept high enough to form the metaborate $HBO_2$. When the electrodes are of aluminum, 5 grams of aluminum powder are worked into the viscous electrolyte, and while the fineness of the powder is not critical, I prefer to employ a powder of 600 or more mesh. The mixture is then brushed or otherwise applied to the gauze 5 which is then interposed between the electrode plates 1 and 2 when the assembly may be subjected to a forming E. M. F. of suitable voltage whereby the protective and insulating oxide-film is formed on one or both electrodes depending on whether the condenser is to be used for A. C. or D. C. It will be obvious of course that the invention is not limited to condensers having sheet metal electrodes, for example the metal electrodes may consist of aluminum foil so that when the gauze strip carrying the electrolyte is positioned therebetween the assembly may be rolled to form a so-called wound type condenser. While the theory of functioning of the metallic filler is not clearly understood, it is believed that each metallic particle forms an active center for self-ionized molecules and because of the great number of these centers the whole mass of the electrolyte becomes a very active catalyzed compound mixture. Furthermore the powdered metallic filler imparts to the electrolyte a positive temperature coefficient so that when the condenser warms up, the increased resistance in the electrolyte adds to the efficiency of the condenser whereas in the case of a carbon or lamp black filler the temperature coefficient of the electrolyte assumes a negative characteristic which is undesirable in this type of device. Furthermore, the metallic particles being good conductors of heat also act as heat dissipators insuring that the whole mass of the electrolyte is kept at a uniform temperature and this temperature is materially lower than when the metallic filler is omitted. In place of using ammonium hydroxide to form the electrolyte any one of the high boiling amines may be employed. The very fine comminuted metal powder which is mixed with the supersaturated solution of the electrolyte may bring about a certain degree of peptization due to the surface energy relations between the metal and the complexed ionized salt, and this in turn produces a disperse phase analogous to an emulsion. The addition of the ceric salts or other catalytic salts above described lessens or prevents the precipitation of a colloidal formation around or on the anode resulting in a reduced power factor for the finished condenser. Furthermore, the presence of the anodic oxidation catalysts above described accelerates the oxidation action of the anode and assists in the film formation.

While specific materials and proportions of parts have been described herein, it will be understood that variations may be made therein over relatively wide ranges without departing from the spirit and scope of the invention.

What is claimed is:

1. In an electrolytic device of the character described, the combination of a metal electrode, an electrolyte of a film-forming composition having an acid reaction, and a conductive filler including a powdered metal having very little electrochemical difference with relation to the electrode metal, and an oxidation catalyst of the cerium group.

2. An electrolytic condenser of the oxide film electrode type having an electrolyte containing a powdered catalytic ionization accelerator of a metal very close to the electrode metal in the electrochemical series, and an oxidation catalyst of the cerium group.

3. A condenser according to claim 2 in which the oxidation catalyst includes a cerium salt.

4. An electrolytic condenser having a filmed aluminum metal electrode, a film-forming electrolyte having incorporated therein a conductive metallic filler of aluminum particles of the order of 600 mesh to impart a positive temperature-resistance coefficient to the electrolyte, and an oxidation catalyst of the cerium group.

5. An electrolyte with an acid reaction for electrolytic devices including a film-forming acid, having incorporated therein a powdered metallic filler which acts as an effective autoionization accelerator and an oxidation catalyst of the cerium group.

6. In an electrolytic device the combination of an aluminum electrode having a highly insulating oxide film thereon, and an electrolyte with an acid reaction comprising a heterogeneous mixture of a plastic reaction product of a film-forming acid and a polyalcohol and a quantity of powdered metallic aluminum incorporated into said product, and an oxidation catalyst of the cerium group.

HARRY D. COWLES.